United States Patent
Kuroe

(10) Patent No.: US 9,534,650 B2
(45) Date of Patent: Jan. 3, 2017

(54) FRICTION MATERIAL

(71) Applicant: AKEBONO BRAKE INDUSTRY CO., LTD., Tokyo (JP)

(72) Inventor: Motoki Kuroe, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 13/848,298

(22) Filed: Mar. 21, 2013

(65) Prior Publication Data

US 2013/0253177 A1 Sep. 26, 2013

(30) Foreign Application Priority Data

Mar. 23, 2012 (JP) ................................. 2012-067974
Sep. 11, 2012 (JP) ................................. 2012-199752

(51) Int. Cl.
*F16D 69/02* (2006.01)
*C08H 7/00* (2011.01)

(52) U.S. Cl.
CPC ............... *F16D 69/025* (2013.01); *C08H 6/00* (2013.01); *F16D 69/026* (2013.01)

(58) Field of Classification Search
CPC .......... F16D 69/00; F16D 69/025; C08H 6/00; C08L 61/06; C08L 2666/26; C08L 97/005
See application file for complete search history.

(56) References Cited

U.S. PATENT DOCUMENTS

| | | | | |
|---|---|---|---|---|
| 4,239,666 A | * | 12/1980 | Jacko et al. | 523/157 |
| 4,385,682 A | * | 5/1983 | Yamamoto et al. | 192/107 M |
| 4,861,809 A | * | 8/1989 | Ogawa et al. | 523/149 |
| 5,089,589 A | * | 2/1992 | Hesse et al. | 528/129 |
| 5,254,639 A | | 10/1993 | Gardziella et al. | |
| 5,260,405 A | | 11/1993 | Gardziella et al. | |
| 5,300,593 A | | 4/1994 | Gardziella et al. | |
| 2011/0259686 A1 | * | 10/2011 | Hattori et al. | 188/250 B |
| 2012/0302699 A1 | * | 11/2012 | Kobune et al. | 525/54.42 |

FOREIGN PATENT DOCUMENTS

| | | |
|---|---|---|
| CN | A-101891933 | 11/2010 |
| DE | 42 26 329 A1 | 5/1993 |
| DE | 42 26 330 A1 | 7/1993 |
| JP | 11-513726 A | 11/1999 |
| JP | A-2004-352978 | 12/2004 |
| JP | 2008-156601 A | 7/2008 |
| WO | WO-97/14747 A1 | 4/1997 |
| WO | WO 2011099544 A1 * | 8/2011 |

OTHER PUBLICATIONS

Kuroe, M., et al., "Application of lignin-modified phenolic resins to brake friction," J. Appl. Polym. Sci., 2013, 310-315, published online Nov. 9, 2012.*
English language translation of JP2008-156601, performed on JPO website on May 7, 2014.*
Fiege, H., et al., "Phenol derivatives", Ullmann's Encyclopedia of Industrial Chemistry, published online 2010, vol. 26, p. 525.*
Jacko, M. G. "Thermal analysis of friction materials," Analytical Calorimetry, p. 289-296, 1968.*
Hesse, W., et al. "Phenolic resins," Ullmann's Encyclopedia of Industrial Chemistry, published online: Feb. 2011.*
Biermann, Christopher J.. (1996). Handbook of Pulping and Papermaking (2nd Edition)—3.7 Soda Pulping. (pp. 87). Elsevier.*
Zhen, Z., et al., "Study on the Synthesis and Properties of Lignin-Modified High Wearable Phenolic Resins," Journal of Cellulose Science and Technology, 2011, 19, 13-18 (English language translation).*
Cho, J., al. "Kinetics and Reaction Chemistry for Slow Pyrolysis of Enzymatic Hydrolysis Lignin and Organosolv Extracted Lignin Derived from Maplewood," Green Chem., 2012, 14, 428-439.*
Tingda Jiang; First Edition, Mar. 2001; Chemical Industry Press.
JP Office Action dated Jan. 26, 2016 from corresponding Japanese Patent Application No. 2012-067974 (with attached Partial English-language translation).
Journal of Cellulose Science and Technology, vol. 19, No. 1, p. 13-18 (2011).

* cited by examiner

*Primary Examiner* — Liam J Heincer
*Assistant Examiner* — Nicholas Hill
(74) *Attorney, Agent, or Firm* — Drinker Biddle & Reath LLP

(57) ABSTRACT

A friction material containing, as a binder, a lignin-phenol resin having a weight average molecular weight of 5,000 or less or a cardanol-modified lignin-phenol resin having a weight average molecular weight of 5,000 or less. The friction material is produced by a method including: reacting a lignin having a weight average molecular weight of 5,000 or less, a phenol, an aldehyde, and optionally a cardanol, in the presence of an acid catalyst.

11 Claims, No Drawings

FRICTION MATERIAL

CROSS-REFERENCE TO RELATED APPLICATIONS

This application claims priority from Japanese Patent Application No. 2012-067974 filed on Mar. 23, 2012 and Japanese Patent Application No. 2012-199752 filed on Sep. 11, 2012, the entire subject matters of which are incorporated herein by reference.

BACKGROUND OF THE INVENTION

Technical Field

The present invention relates to a friction material with low environmental load using a carbon neutral plant-derived material as a raw material, and particularly to a friction material to be used for brake pads, brake linings, clutch facings and the like for automobiles, railway vehicles, industrial machines and the like.

Background Art

A friction material used for brakes and clutches includes, for example, materials such as a fibrous base material for exerting a reinforcing action, a friction adjusting material for imparting a friction action and adjusting its friction performance and a binder for integrating these components.

A problem of global warming due to an increase of a carbon dioxide concentration in atmospheric has recently been becoming a global problem, and techniques for reducing carbon dioxide emissions have been developed in various industrial fields. Also in the field of friction materials, consideration has been needed for wear powder generated from the friction materials and environmental load caused by the friction materials discarded, from the viewpoint of environmental preservation. Under these circumstances, it has been attracting attention to use carbon neutral plant-derived materials. For example, a lignin, which is a polyphenol much contained in wood and the like, is produced as a by-product when obtaining cellulose in the pulp production, so that there have been attempts to effectively utilize the lignin.

Patent Document 1 describes that noise, wear and sulfurous odor can be reduced by replacing about 1 to 30% by weight of a phenol resin, which is a binder component in a friction material composition, with an organosolv lignin substantially free from sulfur and low in water solubility.

Patent Document 2 describes a lignin-modified novolac type phenolic resin and a production method thereof.

Patent Document 1: JP-T-11-513726 (the term "JP-T" as used herein means a published Japanese translation of a PCT application)

Patent Document 2: JP-A-2008-156601

SUMMARY OF THE INVENTION

However, in the binder resin composition described in Patent Document 1, an organosolv lignin powder is only blended as a raw material of the friction material, and it is difficult to be compatible with the phenol resin. Accordingly, an amount of lignin substitutions is limited, and further, thermal fluidity thereof is deteriorated during the formation thereof. As a result, there has been still room for improvement, such as poor formability or the like. Furthermore, in Patent Document 2, there is no description for binder use of the friction material.

In order to solve the above-mentioned problems, illustrative aspects of the present invention provides a friction material having improved friction performance (fade resistance) without impairing the strength while reducing environmental load by increasing the biomass content.

As a result of the various investigations, the present inventor has found that the above-described problem can be solved by the following friction material. That is, the present invention includes the following aspects.

<1> A friction material containing, as a binder, a lignin-phenol resin having a weight average molecular weight of 5,000 or less or a cardanol-modified lignin-phenol resin having a weight average molecular weight of 5,000 or less.

<2> The friction material according to <1>, which contains, as a binder, the lignin-phenol resin having a weight average molecular weight of 5,000 or less <3> The friction material according to <2>, wherein the lignin-phenol resin has a softening point of 50 to 150° C.

<4> The friction material according to <2> or <3>, wherein the lignin-phenol resin is obtained by a process comprising reacting a lignin, a phenol and an aldehyde in the presence of an acid catalyst.

<5> The friction material according to <1>, which contains, as a binder, the cardanol-modified lignin-phenol resin having a weight average molecular weight of 5,000 or less <6> The friction material according to <5>, wherein the cardanol-modified lignin-phenol resin has a softening point of 50 to 150° C.

<7> The friction material according to <5> or <6>, wherein the cardanol-modified lignin-phenol resin is obtained by a process comprising reacting a lignin, a phenol, a cardanol and an aldehyde in the presence of an acid catalyst.

<8> The friction material according to <4> or <7>, wherein the lignin is at least one selected from the group consisting of a softwood lignin, a hardwood lignin and a herbaceous lignin.

<9> A method for producing a friction material, the method comprising:

reacting a lignin having a weight average molecular weight of 5,000 or less, a phenol, an aldehyde, and optionally a cardanol, in the presence of an acid catalyst, thereby obtaining a lignin-phenol resin, or a cardanol-modified lignin-phenol resin if the cardanol is used.

<10> The method according to <9>, the method comprising:

reacting the lignin having a weight average molecular weight of 5,000 or less, the phenol and the aldehyde in the presence of the acid catalyst, thereby obtaining the lignin-phenol resin.

<11> The method according to <10>, wherein the lignin-phenol resin has a softening point of 50 to 150° C.

<12> The method according to <9>, the method comprising:

reacting the lignin having a weight average molecular weight of 5,000 or less, the phenol, the cardanol and the aldehyde in the presence of the acid catalyst, thereby obtaining the cardanol-modified lignin-phenol resin.

<13> The method according to <12>, wherein the cardanol-modified lignin-phenol resin has a softening point of 50 to 150° C.

<14> The method according to any one of <9> to <13>, wherein the lignin is at least one selected from the group consisting of a softwood lignin, a hardwood lignin and a herbaceous lignin.

<15> The method according to any one of <9> to <14>, comprising:

purifying a lignin with at least one solvent selected from the group consisting of methanol, ethanol, acetone and tetrahydrofuran, thereby obtaining the lignin having a weight average molecular weight of 5,000 or less.

According to the present invention, a friction material in which friction performance (fade resistance) can be improved can be provided without impairing the strength, even when a plant-derived material is used.

DETAILED DESCRIPTION OF THE INVENTION

<Lignin-Phenol Resin>

In the friction material according to the present invention, since a phenol resin which is a conventional binder component may be replaced with a lignin-phenol resin, the friction material has low environmental load.

The lignin-phenol resin in the present invention is obtained by mixing and reacting a lignin, a phenol and an aldehyde. The phenol and lignin are reacted at the molecular level to form an integral resin, so that thermal fluidity during the formation of the friction material is good. Further, the lignin content can be more improved than the case in Patent Document 1.

<Cardanol-Modified Lignin-Phenol Resin>

In the friction material according to the present invention, since a phenol resin which is a conventional binder component may be replaced with a cardanol-modified lignin-phenol resin, the friction material has low environmental load.

The cardanol-modified lignin-phenol resin in the present invention is obtained by mixing and reacting a lignin, a phenol, a cardanol and an aldehyde. The phenol, lignin and cardanol are reacted at the molecular level to form an integral resin, so that thermal fluidity during the formation of the friction material is good. Further, the content of the lignin and cardanol, i.e. biomass content, can be more improved than the case in Patent Document 1.

The lignin is a main component of plant cell walls occurring together with cellulose or hemicelluloses in a plant body such as wood, and is a polymer compound obtained by amorphously polymerizing phenylpropane as a basic unit. The lignin can be separated and extracted from the plant body by various methods. However, it is usually difficult to take out a lignin occurring in the plant body in its original form, and it is extracted as a lignin derivative.

In the present invention, the plant body from which the lignin is extracted and an extracting method thereof are not limited.

The plant body is not particularly limited as long as it contains a lignin and is wood or an herbaceous species in which a woody part is formed. Examples thereof include: softwoods such as Japanese cedar, pine and Japanese cypress; hardwoods such as beech and Japanese zelkova; and gramineous plants (herbaceous species) such as rice, barley, wheat, cone and bamboo. As described above, the lignin is roughly classified into three main groups: softwood lignin; hardwood lignin; and herbaceous lignin, on the basis of the plant body of origin. In the present invention, one or two or more of these can be used.

As the basic skeletons of the lignin, as shown in the following formulae, there are a guaiacyl type (type G) shown in formula G, a syringyl type (type S) shown in formula S, a p-hydroxyphenyl type (type H) shown in formula H, and the like, depending on the number of a methoxyl group as the characteristic functional groups which is substituted in place of a hydrogen atom in the phenylpropane structure as the basic unit. The lignin is different in the basic skeleton depending on the plant body of origin, and the softwood lignin is composed of the type G, the hardwood lignin is composed of the type G and Type S and the herbaceous lignin is composed of the type G, type S and type H.

[Chem. 1]

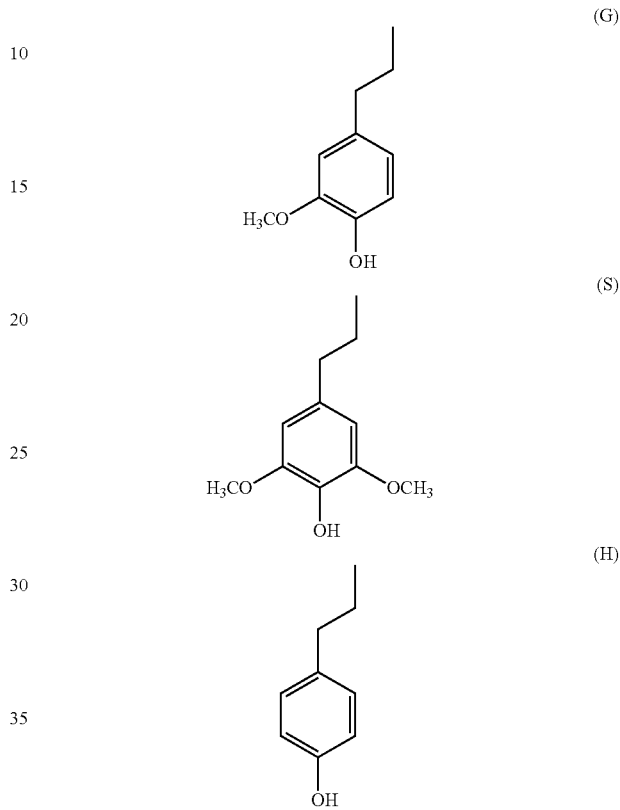

The extracting methods are roughly classified into two types: a method of hydrolyzing cellulose and hemicellulose in the plant body to leave a lignin as an insoluble residue; and a method of making a lignin into a solubilizable lignin, and then allowing the solubilizable lignin to be eluted. Examples of the former method include an acid hydrolysis method of allowing concentrated sulfuric acid to act on wooden fragments and separating a lignin from a remaining portion, and the like. Examples of the latter method include a soda cooking method of separating a lignin with sodium hydroxide, a phase separation conversion system of separating a lignin using a phenol as a solvent, a solvent method of separating a lignin using an organic solvent, an extraction method using a supercritical or subcritical fluid, and the like.

The above-mentioned plant bodies and lignin extraction methods may be appropriately combined with each other.

Further, the molecular weight (weight average molecular weight) of the lignin to be used as a raw material of the lignin-phenol resin or the cardanol-modified lignin-phenol resin is preferably 5,000 or less, and more preferably 4,000 or less. The weight average molecular weight within such a range is preferred because of good thermal fluidity during the formation of the synthesized lignin-phenol resin or the synthesized cardanol-modified lignin-phenol resin. The weight average molecular weight can be measured by using a gel permeation chromatography (GPC). More specifically, a sample dissolved in THF is measured by using a GPC system (manufactured by Waters) at a THF flow rate of 1 ml/min; TSK-GEL G2000 and G4000 (both manufactured by Tosoh Corporation) is used as a column, and an elution time is detected by using a differential refractometer; and the weight average molecular weight of the sample is calculated from a standard curve using polystyrene as a standard substance.

Furthermore, the softening point of the lignin to be used as the raw material of the lignin-phenol resin or the cardanol-modified lignin-phenol resin in the present invention is preferably from 70 to 180° C., more preferably from 80 to 160° C., and still more preferably from 90 to 130° C. The softening point within such a range is preferred because of good thermal fluidity during the formation of the synthesized lignin-phenol resin or the synthesized cardanol-modified lignin-phenol resin. The softening point is a value measured by a thermomechanical measuring device. More specifically, the softening point can be measured as follows: the measurement is performed under the following conditions: temperature of from 30 to 250° C.; rate of temperature increase of 5° C./min; load of 1 kgf; nitrogen atmosphere; and measuring device of a thermomechanical measuring device (e.g. TMA-60: manufactured by Shimadzu Corporation), and a tangent intersection point at an inflection point is taken as the softening point.

In order to adjust the molecular weight (weight average molecular weight) and softening point of the lignin to the above-mentioned ranges, among crude lignin extracts, examples thereof include a method where a lignin which is soluble in a solvent such as methanol, ethanol, acetone or tetrahydrofuran is purified. The lignin which is soluble in such a solvent has a relatively low weight average molecular weight, and meets the above-mentioned range of the softening point. For example, when the softening point of a lignin (manufactured by Harima Chemicals Inc., product name: HIGH-PURITY LIGNIN) extracted from the gramineous plant by the soda cooking method and purified with each of the following organic solvents was measured, the following results were obtained: the case of using methanol: 126° C., the case of using ethanol: 109° C., the case of using acetone: 107° C. and the case of using tetrahydrofuran: 101° C. From these results, it has been revealed that a lignin-phenol resin or cardanol-modified lignin-phenol resin which has a softening point showing appropriate thermal fluidity required during the formation of the friction material is obtained by selecting the appropriate organic solvent. However, when the crude extracts themselves already meet the ranges of the above-mentioned molecular weight (weight average molecular weight) and softening point, no purifying operation may be required.

The lignin may be used either alone or in combination of two or more thereof.

The phenol used in the present invention means phenol or a phenol derivative. The phenol derivative is not particularly limited as long as it has a phenol skeleton, and may have any substituent on a benzene ring. Examples of such an substituent include an alkyl group, a halogen atom, an amino group, a nitro group, a carboxy group and the like. Specific examples of the phenol include phenol, o-cresol, m-cresol, p-cresol, catechol, resorcinol, hydroquinone, 2,3-dimethylphenol, 2,4-dimethylphenol, 2,5-dimethylphenol, 2,6-dimethylphenol, 3,4-dimethylphenol, 3,5-dimethylphenol, p-tert-butylphenol, bisphenol A, o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-aminophenol, m-aminophenol, p-aminophenol, o-nitrophenol, m-nitrophenol, p-nitrophenol, 2,4-dinitrophenol, 2,4,6-trinitrophenol, salicylic acid, p-hydroxybenzoic acid and the like. Among these, phenol and cresol are particularly preferred.

The above-mentioned phenol may be used either alone or in combination of two or more thereof.

Examples of the aldehyde used in the present invention include formaldehyde, paraformaldehyde, acetaldehyde, n-butylaldehyde, isobutylaldehyde, trioxane, propionaldehyde, polyoxymethylene, chloral, hexamethylenetetramine, furfural, glyoxal, caproaldehyde, allylaldehyde, benzaldehyde, crotonaldehyde, acrolein, tetraoxymethylene, phenylacetaldehyde, o-tolualdehyde, salicylaldehyde, p-xylene dimethyl ether and the like. Preferable examples thereof include formaldehyde, paraformaldehyde, trioxane, polyoxymethylene, acetaldehyde and p-xylene dimethyl ether. These may be used either alone or in combination of two or more thereof, and particularly, formaldehyde is preferred.

The cardanol used in the present invention is a component contained in a shell of a cashew nut, and is a phenol derivative represented by the following general formula. In the following general formula, as the structure of R, there are four kinds as shown in the following formula. The cardanol is a mixture of the following four kinds of the phenol derivatives. As the cardanol, a normal cardanol which is extracted from a shell of a cashew nut and/or a hydrogenated cardanol in which a hydrogen atom is added to the unsaturated bond in the part of R may be used.

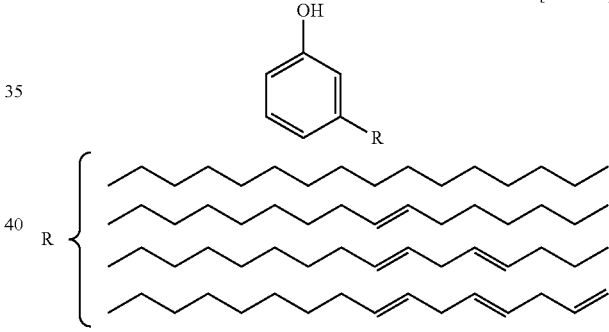

[Chem. 2]

Examples of the acid catalyst used in the present invention include hydrochloric acid, sulfuric acid, oxalic acid, p-toluenesulfonic acid, phosphoric acid, tartaric acid, citric acid and the like. Among these, organic acids such as oxalic acid and p-toluenesulfonic acid are preferred.

In the synthesis of the lignin-phenol resin, the blending ratio of the phenol is preferably from 20 to 200 parts by mass, and more preferably from 40 to 150 parts by mass, based on 100 parts by mass of the lignin. By satisfying such a condition, the softening point of the resulting lignin-phenol resin can be adjusted to the preferred range described later.

The blending ratio of the aldehyde is preferably from 1 to 80 parts by mass based on 100 parts by mass of the lignin. By satisfying such a condition, the softening point of the resulting lignin-phenol resin can be adjusted to the preferred range described later.

The amount of the acid catalyst is preferably from 0.1 to 10 parts by mass based on 100 parts by mass of the phenol.

The lignin content in the lignin-phenol resin after the synthesis is preferably from 20 to 90% by mass, and more preferably from 40 to 85% by mass, in terms of thermal fluidity during the formation of the friction material. The lignin content can be calculated herein by (added amount of lignin)/(yield of lignin-phenol resin)×100, assuming that the mass of a lignin does not change before and after the synthesis thereof. The lignin content within such a range is preferred, because it is possible to form the friction material, and the friction material can have a friction coefficient equivalent to or more than the case of a conventional friction material.

The lignin-phenol resin in the present invention can be obtained by reacting the lignin, the phenol and the aldehyde in the presence of the acid catalyst. Although a mixing method of the phenol and the lignin is not particularly limited, it is preferred that stirring is performed at 80 to 120° C. for 30 minutes to 2 hours. Further, a polymerization reaction after addition of the catalyst is conducted preferably at 70 to 130° C., more preferably at 80 to 120° C. Further, the reaction time is preferably from 10 minutes to 6 hours, and more preferably from 30 minutes to 3 hours.

Then, water and an unreacted phenol are removed from the resulting reaction mixture by distillation, preferably by atmospheric distillation and/or distillation under reduced pressure. In particular, it is preferred to conduct distillation under reduced pressure at 120 to 200° C.

The molecular weight (weight average molecular weight) of the lignin-phenol resin obtained by the above-mentioned method is preferably 5,000 or less, and more preferably 4,000 or less. The weight average molecular weight of the lignin-phenol resin within such a range is preferred because of good thermal fluidity during the formation of the friction material. In order to adjust the weight average molecular weight to the above-mentioned range, examples thereof include a method where a lignin having a weight average molecular weight of 5,000 or less is used.

Then, the softening point of the lignin-phenol resin in the present invention is preferably from 50 to 150° C., and more preferably from 50 to 130° C. The softening point of the lignin-phenol resin within such a range is preferred, because thermal flow of the resin occurs before initiation of curing reaction of the resin. In order to adjust the softening point of the resin to the above-mentioned range, examples thereof include a method where a lignin is purified with a solvent as needed, and a lignin having a softening point within the above-mentioned preferred range is used as a raw material thereof. The softening point can be determined by the above-mentioned method.

In the synthesis of the cardanol-modified lignin-phenol resin, the blending ratio of the phenol is preferably from 20 to 200 parts by mass, and more preferably from 40 to 150 parts by mass, based on 100 parts by mass of the lignin. By satisfying such a condition, the softening point of the resulting cardanol-modified lignin-phenol resin can be adjusted to the preferred range described later. In addition, the blending ratio of the cardanol is preferably from 1 to 50 parts by mass, and more preferably from 10 to 40 parts by mass, based on 100 parts by mass of the lignin. By satisfying such a condition, thermal fluidity of the resin during the formation of the friction material can be improved.

The blending ratio of the aldehyde is preferably from 1 to 80 parts by mass based on 100 parts by mass of the lignin. By satisfying such a condition, the softening point of the resulting cardanol-modified lignin-phenol resin can be adjusted to the preferred range described later.

The amount of the acid catalyst is preferably from 0.1 to 10 parts by mass based on 100 parts by mass of the phenol.

The biomass content in the cardanol-modified lignin-phenol resin after the synthesis is preferably from 20 to 90% by mass, and more preferably from 40 to 85% by mass, in terms of thermal fluidity during the formation of the friction material. Here, the biomass means a total of the lignin and the cardanol, and the biomass content can be calculated by (added amount of lignin and cardanol)/(yield of cardanol-modified lignin-phenol resin)×100, assuming that each of the mass of a lignin and a cardanol does not change before and after the synthesis thereof. The biomass content within such a range is preferred, because it is possible to form the friction material, and the friction material can have a friction coefficient equivalent to or more than the case of a conventional friction material.

The cardanol-modified lignin-phenol resin in the present invention can be obtained by reacting the lignin, the phenol, the cardanol and the aldehyde in the presence of the acid catalyst. Although a mixing method of the phenol, the lignin and the cardanol is not particularly limited, it is preferred that stirring is performed at 80 to 120° C. for 30 minutes to 2 hours. Further, a polymerization reaction after addition of the catalyst is conducted preferably at 70 to 130° C., more preferably at 80 to 120° C. Further, the reaction time is preferably from 10 minutes to 6 hours, and more preferably from 30 minutes to 3 hours.

Then, water and an unreacted phenol are removed from the resulting reaction mixture by distillation, preferably by atmospheric distillation and/or distillation under reduced pressure. In particular, it is preferred to conduct distillation under reduced pressure at 120 to 200° C.

The molecular weight (weight average molecular weight) of the cardanol-modified lignin-phenol resin obtained by the above-mentioned method is preferably 5,000 or less, and more preferably 4,000 or less. The weight average molecular weight of the cardanol-modified lignin-phenol resin within such a range is preferred because of good thermal fluidity during the formation of the friction material. In order to adjust the weight average molecular weight of the resin to the above-mentioned range, examples thereof include a method where a lignin having a weight average molecular weight of 5,000 or less is used, and a method where the amount of the aldehyde to the lignin, phenol and cardanol is adjusted.

Then, the softening point of the cardanol-modified lignin-phenol resin in the present invention is preferably from 50 to 150° C., and more preferably from 50 to 130° C. The softening point of the cardanol-modified lignin-phenol resin within such a range is preferred, because thermal flow of the resin occurs before initiation of curing reaction of the resin. In order to adjust the softening point of the resin to the above-mentioned range, examples thereof include a method where a lignin is purified with a solvent as needed, and a lignin having a softening point within the above-mentioned preferred range is used as a raw material thereof, and a method where the amount of the aldehyde to the lignin, phenol and cardanol is adjusted.

<Friction Material>

The friction material of the present invention contains a fibrous base material, a friction adjusting material and a binder, and the above-mentioned lignin-phenol resin or cardanol-modified lignin-phenol resin is blended as the binder.

In the case of using the lignin-phenol resin, the lignin content in the binder is preferably from 50 to 90% by mass, and more preferably from 60 to 85% by mass, in terms of reduced environmental load and formability.

In the case of using the cardanol-modified lignin-phenol resin, the biomass content in the binder is preferably from 50 to 95% by mass, and more preferably from 60 to 90% by mass, in terms of reduced environmental load and formability.

The fibrous base material used in the present invention is not particularly limited, and a fibrous base material which is usually used in this field is used. Examples thereof include organic fibers such as aromatic polyamide fibers and flame-proofed acrylic fibers, metal fibers such as copper fibers and brass fibers, and inorganic fibers such as potassium titanate fibers, $Al_2O_3$—$SiO_2$-based ceramic fibers, biosoluble ceramic fibers, glass fibers and carbon fibers, and these fibers may be used either alone or in combination of two or more thereof. The fiber length of the fibrous base material is preferably from 100 to 2,500 μm, and the fiber diameter thereof is preferably from 3 to 600 μm.

The blended amount of the fibrous base material is preferably from 1 to 30% by mass, and more preferably from 5 to 15% by mass, based on the entire friction material.

The blended amount of the binder in the friction material of the present invention is not particularly limited, but it is preferably from 5 to 20% by mass, and more preferably from 5 to 10% by mass, based on the entire friction material.

Further, in the friction material of the present invention, in addition to the above-mentioned lignin-phenol resin or cardanol-modified lignin-phenol resin, a well-known component usually used as a binder for friction materials can also be used together as the binder, as needed. Examples thereof include thermosetting resins such as melamine resins, epoxy resins and polyimide resins, and these may be used either alone or in combination of two or more thereof.

In the present invention, as the friction adjusting material for imparting a friction action and adjusting its friction performance, various friction adjusting materials can be used depending on various purposes thereof, and various solid powder materials called abrasive materials, fillers, solid lubricating materials or the like, which are usually used in the friction material, can be used.

Examples thereof include: inorganic fillers such as calcium carbonate, barium sulfate, calcium hydroxide, iron sulfide, copper sulfide, silicon oxide, metal powders (such as copper powder, aluminum powder, bronze powder and zinc powder), vermiculite and mica; abrasive materials such as alumina, magnesia and zirconia; various rubber powders (such as rubber dust and tire powder); organic fillers such as cashew dust and melamine dust; solid lubricating materials such as graphite and molybdenum disulfide; and the like. These may be blended either alone or in combination of two or more thereof, depending on friction characteristics required for a product, for example, friction coefficient, wear resistance, vibration characteristics and squealing characteristics.

The blended amount of these friction adjusting materials is preferably from 50 to 90% by mass, and more preferably from 70 to 90% by mass, based on the entire friction material.

The friction material of the present invention can be produced by blending predetermined amounts of the above-mentioned fibrous base material, friction adjusting material and binder, and pre-forming the resulting blended material by a conventional method, followed by performing treatments such as thermoforming, heating and polishing.

A brake pad including the above-mentioned friction material can be produced by a process of thermoforming a pressure plate, which has been formed into a predetermined shape by a sheet metal press, subjected to a degreasing treatment and a primer treatment and coated with an adhesive, and the pre-formed body of the friction material in a thermoforming process at a forming temperature of 140 to 170° C. and a forming pressure of 30 to 80 MPa for 2 to 10 minutes to integrally firmly fix both materials to each other, aftercuring the resulting formed article at a temperature of 150 to 300° C. for 1 to 4 hours, and finally performing a finishing treatment.

EXAMPLES

The present invention will be described in detail below with reference to examples and comparative examples. However, the present invention should not be construed as being limited to the following examples.

Test Example 1

<Preparation of Lignin-Phenol Resins>

A lignin (manufactured by Harima Chemicals Inc., product name: HIGH-PURITY LIGNIN, softening point: 165° C.) extracted from a gramineous plant by a soda cooking method was purified with methanol to obtain a lignin (weight average molecular weight: 1,600) having a softening point of 126° C. A method for measuring the softening point will be described later.

The lignin purified and phenol (manufactured by Wako Pure Chemical Industries, Ltd.) were added into a three-necked flask at ratios shown in Table 1, followed by stirring at 80° C. for 30 minutes. Thereafter, a 37% aqueous solution of formaldehyde and oxalic acid (1.5 mol %) were added thereto, followed by stirring at 100° C. for 1 hour. Next, distillation under reduced pressure was performed while increasing the temperature up to 180° C. to remove water and unreacted phenol, thereby obtaining lignin-phenol resins A to C.

TABLE 1

| | (parts by mass) Binder resin | | |
| --- | --- | --- | --- |
| | Resin A | Resin B | Resin C |
| Lignin | 100 | 100 | 100 |
| Phenol | 141 | 94 | 47 |
| 37% Formaldehyde | 32 | 24 | 16 |
| Yield (Lignin-phenol resin) | 164 | 135 | 119 |

Various physical properties of the lignin-phenol resins A to C were evaluated and compared with those of a commercially available phenol resin D (manufactured by Sumitomo Bakelite Co., Ltd., RANDOM NOVOLAC, weight average molecular weight: 7,200). For evaluation of thermal fluidity, heat resistance and bending strength, a sample obtained by adding 10 phr of hexamethylenetetramine (manufactured by Wako Pure Chemical Industries, Ltd.) to each of the resins, followed by curing thereof, was used.

<Thermal Fluidity Evaluation (Pressure Flow Measurement)>

Between two steel plates which had been heated to 150° C., 0.3 g of a sample was placed, and a load of 5,000 kgf was applied thereto and kept for 4 minutes. Then, the load was removed, and the plane area of the sample circularly expanded and solidified was measured.

<Heat Resistance Test>

After each of the resins was kept at 150° C. for 1 hour, and further thermally cured at 250° C. for 3 hours by applying heat thereto, 10 mg thereof was taken into an alumina vessel, and the temperature thereof was increased from 30 to 1,000°

C. at a rate of temperature increase of 10° C./min under a nitrogen atmosphere. The temperature (Td5) at which the weight thereof decreases by 5% from the initial weight was measured.

<Softening Point Measurement>

3 mg of a sample was placed in an alumina vessel, and measurement was performed using a thermomechanical measuring device (TMA-60: manufactured by Shimadzu Corporation). A tangent intersection point at an inflection point was taken as the softening point. Measurement conditions were as follows:
  Temperature: from 30 to 250° C.
  Rate of temperature increase: 5° C./min
  Load: 1 kgf
  Atmosphere: nitrogen atmosphere <Bending Strength Measurement>

20% by volume of the resin and 80% by volume of calcium carbonate were mixed with each other, and the mixture was cured to prepare a formed body. Then, the bending strength thereof was measured in accordance with JIS-K7171.

The evaluation results of various physical properties are shown in Table 2. The lignin content as used herein means a value represented by (added amount of lignin)/(yield of lignin-phenol resin)×100.

TABLE 2

|  | Binder resin | | | |
| --- | --- | --- | --- | --- |
|  | Resin A | Resin B | Resin C | Resin D (Phenol resin) |
| Lignin content (% by mass) | 61 | 74 | 84 | 0 |
| Weight average molecular weight | 1430 | 1840 | 2140 | 7200 |
| Pressure flow (cm$^2$) | 102 | 60 | 53 | 91 |
| Softening point (° C.) | 52 | 79 | 124 | 81 |
| Heat resistance Td5 (° C.) | 358 | 339 | 340 | 303 |
| Bending strength (MPa) | 22 | 25 | 21 | 23 |

From the measurement results, it is shown that the lignin-phenol resins according to the present invention have a bending strength equivalent to or higher than that of the conventional phenol resin, and are more improved in heat resistance than the case of the conventional phenol resin. The reason for the improvement of heat resistance is believed to be that carbonization more proceeds in the lignin-phenol resins than the case in the phenol resin.

<Preparation of Friction Materials>

The resins A, B and D obtained above were each mixed with other materials by a mixer at blending ratios shown in Table 3 to prepare raw material mixtures. The raw material mixtures were each thermoformed at a forming pressure of 50 MPa and a forming temperature of 150° C., and further heat treated at 250° C. for 3 hours to obtain friction materials of Examples 1-1 and 1-2 and Comparative Example 1-1.

TABLE 3

|  | Example 1-1 (Resin A) | Example 1-2 (Resin B) | (% by mass) Comparative Example 1-1 (Resin D) |
| --- | --- | --- | --- |
| Binder resin | 10 | 10 | 10 |
| Hexamethylenetetramine | 1 | 1 | 1 |
| Aramid pulp | 5 | 5 | 5 |
| Inorganic fiber (Potassium titanate) | 25 | 25 | 25 |
| Barium sulfate | 50 | 50 | 50 |
| Graphite | 4 | 4 | 4 |
| Cashew dust | 5 | 5 | 5 |

<Friction Characteristic Test>

From each friction material prepared, a test specimen of 13 mm×35 mm×10 mm was cut out, and subjected to the friction characteristic test in accordance with JASO-C406 using the 1/10 scale brake dynamometer (Examples 1-1 and 1-2 and Comparative Example 1-1). The measurement results of the minimum friction coefficient (min μ) of a first fade, and second and third effects (130 km/h, 0.6 G) are show in Table 4.

TABLE 4

|  | Example 1-1 | Example 1-2 | Comparative Example 1-1 |
| --- | --- | --- | --- |
| First fade (min μ) | 0.25 | 0.27 | 0.18 |
| Second effect (130 km/h, 0.6 G) | 0.28 | 0.27 | 0.26 |
| Third effect (130 km/h, 0.6 G) | 0.28 | 0.28 | 0.28 |

From the measurement results, the friction materials of Examples 1-1 and 1-2 were more improved in the minimum friction coefficient (min μ) of a first fade than the friction material of Comparative Example 1-1. From this fact, it is known that by using the lignin-phenol resin as the binder, the friction material is obtained, which is more excellent in friction performance (fade resistance) than the case where the conventional phenol resin is used.

Test Example 2

<Preparation of Cardanol-Modified Lignin-Phenol Resins>

A lignin (manufactured by Harima Chemicals Inc., softening point: 165° C.) extracted from a gramineous plant by a soda cooking method was purified with methanol to obtain a lignin (weight average molecular weight: 1,600) having a softening point of 126° C. A method for measuring the softening point will be described later.

The lignin purified, phenol (manufactured by Wako Pure Chemical Industries, Ltd.) and a cardanol (manufactured by Cashew Co., Ltd.) were added into a three-necked flask at ratios shown in Table 5, followed by stirring at 80° C. for 30 minutes. Thereafter, a 37% aqueous solution of formaldehyde and oxalic acid (1.5 mol %) were added thereto, followed by stirring at 100° C. for 1 hour. Next, distillation under reduced pressure was performed while increasing the temperature up to 180° C. to remove water and unreacted phenol, thereby obtaining cardanol-modified lignin-phenol resins A to C.

<Preparation of Lignin-Phenol Resin>

The lignin-phenol resins D and E were obtained in the same manner as the above cardanol-modified lignin-phenol resin except that the cardanol was not blended and the purified lignin and phenol were blended at the ratio shown in Table 5.

Various physical properties of the cardanol-modified lignin-phenol resins A to C and the lignin-phenol resins D and E were evaluated and compared with those of a commercially available phenol resin F (manufactured by Sumitomo Bakelite Co., Ltd., RANDOM NOVOLAC, weight average molecular weight: 7,200).

For evaluation of thermal fluidity and bending strength, a sample obtained by adding 10 phr of hexamethylenetetramine (manufactured by Wako Pure Chemical Industries, Ltd.) to each of the resins, followed by curing thereof, was used.

<Thermal Fluidity Evaluation (Pressure Flow Measurement)>

Between two steel plates which had been heated to 150° C., 0.3 g of a sample was placed, and a load of 5,000 kgf was applied thereto and kept for 4 minutes. Then, the load was removed, and the plane area of the sample circularly expanded and solidified was measured.

<Softening Point Measurement>

3 mg of a sample was placed in an alumina vessel, and measurement was performed using a thermomechanical measuring device (TMA-60: manufactured by Shimadzu Corporation). A tangent intersection point at an inflection point was taken as the softening point. Measurement conditions were as follows:

Temperature: from 30 to 250° C.
Rate of temperature increase: 5° C./min
Load: 1 kgf
Atmosphere: nitrogen atmosphere <Bending Strength Measurement>

20% by volume of the resin and 80% by volume of calcium carbonate were mixed with each other, and the mixture was cured to prepare a formed body. Then, the bending strength thereof was measured in accordance with JIS-K7171.

The evaluation results of various physical properties are shown in Table 5.

The biomass content as used herein means: a value represented by (added amount of lignin and cardanol)/(yield of cardanol-modified lignin-phenol resin)×100, assuming that each of the mass of a lignin and a cardanol does not change before and after the synthesis thereof in the case of the resins A to C; and a value represented by (added amount of lignin)/(yield of lignin-phenol resin)×100, assuming that the mass of a lignin does not change before and after the synthesis thereof in the case of the resins D and E.

From the measurement results, it is shown that the cardanol-modified lignin-phenol resins A to C have thermal fluidity and bending strength equivalent to or higher than those of the conventional phenol resin F. In addition, when the resin A is compared with the resin D, both of which used the same amount of phenol, and when the resins B and C are compared with the resin E, all of which used the same amount of phenol, it is shown that the cardanol-modified lignin-phenol resins A to C have more improved thermal fluidity, since the cardanol-modified lignin-phenol resins A to C have lower softening point and larger pressure flow than the case of the lignin-phenol resins D and E in which a lignin was contained but a cardanol was not contained. The reason thereof is believed to be that, since the resins A to C contain a cardanol which has a weight average molecular weight smaller than a lignin, the resins A to C have an advantage in thermal fluidity (softening point and pressure flow).

In addition, since the blending amount of the cardanol in the resins B and C is higher than that in the resin A, the resins B and C have a high biomass content. If the amount of formaldehyde is increased as in the resin C, the resin obtained has increased weight average molecular weight and softening point in comparison with the case of the resin B. The reason thereof is believed to be that, when the amount of the aldehyde to the lignin, phenol and cardanol is increased, the crosslink density among the lignin, the phenol and the cardanol is increased. Thus, by adjusting the amount of the aldehyde, the weight average molecular weight or softening point of the cardanol-modified lignin-phenol resin can be adjusted.

<Preparation of Friction Materials>

The resins A, C and F obtained above were each mixed with other materials by a mixer at blending ratios shown in Table 6 to prepare raw material mixtures. The raw material mixtures were each thermoformed at a forming pressure of 50 MPa and a forming temperature of 150° C., and further heat treated at 250° C. for 3 hours to obtain friction materials of Examples 2-1 and 2-2 and Comparative Example 2-1.

TABLE 5

Synthesis conditions of resins and evaluation for physical properties

| | | Binder resin | | | | | |
|---|---|---|---|---|---|---|---|
| | | A | B | C | D | E | F |
| Synthesis conditions (part by mass) | Lignin | 100 | 100 | 100 | 100 | 100 | — |
| | Phenol | 94 | 47 | 47 | 94 | 47 | — |
| | Cardanol | 15 | 30 | 30 | — | — | — |
| | 37% Formaldehyde | 25 | 18 | 36 | 24 | 16 | — |
| | Oxalic acid | 0.3 | 0.2 | 0.2 | 0.3 | 0.2 | — |
| | Yield of resin | 155 | 143 | 151 | 135 | 119 | — |
| Evaluation for physical properties | Biomass content (% by mass) | 74 | 91 | 86 | 74 | 84 | 0 |
| | Weight average molecular weight | 2030 | 2400 | 2720 | 1840 | 2140 | 7200 |
| | Pressure flow (cm$^2$) | 98 | 103 | 75 | 60 | 53 | 91 |
| | Softening point (° C.) | 71 | 69 | 86 | 79 | 124 | 81 |
| | Bending strength (MPa) | 20 | 22 | 20 | 25 | 21 | 23 |

TABLE 6

| | Example 2-1 | Example 2-2 | Comparative Example 2-1 (% by mass) |
|---|---|---|---|
| Binder resin A | 10 | — | — |
| Binder resin C | — | 10 | — |
| Binder resin F | — | — | 10 |
| Hexamethylenetetramine | 1 | 1 | 1 |
| Aramid pulp | 5 | 5 | 5 |
| Inorganic fiber (Potassium titanate) | 25 | 25 | 25 |
| Barium sulfate | 50 | 50 | 50 |
| Graphite | 4 | 4 | 4 |
| Cashew dust | 5 | 5 | 5 |

<Friction Characteristic Test>

From each friction material prepared, a test specimen of 13 mm×35 mm×10 mm was cut out, and subjected to the friction characteristic test in accordance with JASO-C406 using the 1/10 scale brake dynamometer (Examples 2-1 and 2-2 and Comparative Example 2-1). The measurement results of the minimum friction coefficient (min μ) of a first fade, and second and third effects (130 km/h, 0.6 G) are show in Table 7.

TABLE 7

| | Example 2-1 | Example 2-2 | Comparative Example 2-1 |
|---|---|---|---|
| First fade (min μ) | 0.25 | 0.28 | 0.18 |
| Second effect (130 km/h, 0.6 G) | 0.27 | 0.29 | 0.26 |
| Third effect (130 km/h, 0.6 G) | 0.28 | 0.27 | 0.28 |

From the measurement results, the friction materials of Examples 2-1 and 2-2 were more improved in the minimum friction coefficient (min μ) of a first fade than the friction material of Comparative Example 2-1. From this fact, it is known that by using the cardanol-modified lignin-phenol resin as the binder, the friction material is obtained, which is more excellent in friction performance (fade resistance) than the case where the conventional phenol resin is used.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A friction material containing, as a binder, a cardanol-modified lignin-phenol resin having a weight average molecular weight of 5,000 or less, as measured by gel permeation chromatography, generated by reacting a lignin, a phenol, a cardanol, and an aldehyde in the presence of an acid catalyst, wherein the following relative amounts of the lignin, phenol, and cardanol are reacted with the aldehyde in the presence of the acid catalyst to generate the cardanol-modified lignin-phenol resin:
   100 parts by mass of the lignin;
   20-200 parts by mass of the phenol; and
   1-50 parts by mass of the cardanol.

2. The friction material according to claim 1, wherein the cardanol-modified lignin-phenol resin has a softening point of 50 to 150° C.

3. The friction material according to claim 1, wherein the lignin is at least one selected from the group consisting of a softwood lignin, a hardwood lignin and a herbaceous lignin.

4. The friction material according to claim 1, further comprising:
   1-80 parts by mass of the aldehyde; and
   0.1-10 parts by mass of the acid catalyst based on 100 parts by mass of the phenol.

5. The friction material according to claim 1, wherein the relative amount of phenol is 40 to 150 parts by mass of the phenol based on 100 parts by mass of the lignin.

6. A method for producing a friction material, the method comprising:
   reacting a lignin having a weight average molecular weight of 5,000 or less, as measured by gel permeation chromatography, a phenol, a cardanol and an aldehyde in the presence of an acid catalyst, to thereby generate a cardanol-modified lignin-phenol resin, wherein the following relative amounts of the lignin, phenol, and cardanol are reacted with the aldehyde in the presence of the acid catalyst to generate the cardanol-modified lignin-phenol resin:
   100 parts by mass of the lignin;
   20-200 parts by mass of the phenol; and
   1-50 parts by mass of the cardanol.

7. The method according to claim 6, wherein the cardanol-modified lignin-phenol resin has a softening point of 50 to 150° C.

8. The method according to claim 6, wherein the lignin is at least one selected from the group consisting of a softwood lignin, a hardwood lignin and a herbaceous lignin.

9. The method according to claim 6, comprising:
   purifying a lignin by contacting it with at least one substance selected from the group consisting of methanol, ethanol, acetone and tetrahydrofuran, to thereby generate the lignin having a weight average molecular weight of 5,000 or less, as measured by gel permeation chromatography.

10. The method according to claim 6, wherein the friction material further comprises:
    1-80 parts by mass of the aldehyde; and
    0.1-10 parts by mass of the acid catalyst based on 100 parts by mass of the phenol.

11. The method according to claim 6, wherein the relative amount of phenol is 40 to 150 parts by mass of the phenol based on 100 parts by mass of the lignin.

* * * * *